(12) United States Patent
Chen et al.

(10) Patent No.: US 9,832,508 B2
(45) Date of Patent: *Nov. 28, 2017

(54) SYSTEM AND METHOD FOR HOME SECURITY MONITORING USING A TELEVISION SET-TOP BOX

(71) Applicant: Time Warner Cable Enterprises LLC, New York, NY (US)

(72) Inventors: John Anthony Chen, Asburn, VA (US); Geoff Filippi, Herndon, VA (US); Jian Yu, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,270

(22) Filed: Dec. 28, 2015

(65) Prior Publication Data

US 2016/0134918 A1 May 12, 2016

Related U.S. Application Data

(63) Continuation of application No. 13/357,760, filed on Jan. 25, 2012, now Pat. No. 9,258,593.

(51) Int. Cl.
*G06F 3/00* (2006.01)
*G06F 13/00* (2006.01)
(Continued)

(52) U.S. Cl.
CPC ... *H04N 21/4131* (2013.01); *G08B 13/19682* (2013.01); *H04L 12/2801* (2013.01); *H04L 12/2807* (2013.01); *H04L 12/2823* (2013.01); *H04L 12/2827* (2013.01); *H04N 21/4223* (2013.01); *H04N 21/43615* (2013.01); *G08B 13/1968* (2013.01); *G08B 25/008* (2013.01); *H04N 21/222* (2013.01); *H04N 21/814* (2013.01)

(58) Field of Classification Search
CPC .......................... H04N 21/40; H04N 21/4131
See application file for complete search history.

(56) References Cited

U.S. PATENT DOCUMENTS

| 7,831,686 B1* | 11/2010 | Tran ...................... H04L 69/40 709/217 |
| 2004/0113770 A1* | 6/2004 | Falk ................. G08B 13/19645 340/531 |

(Continued)

*Primary Examiner* — Joshua Taylor
(74) *Attorney, Agent, or Firm* — Chapin IP Law, LLC

(57) ABSTRACT

Techniques disclosed herein enable automated home security monitoring via a television connected to a set-top box, such as a cable set-top box. Such techniques integrate the television with a home security system. A television viewer can use the television to control, interact, and automatically receive information about home security events in real-time. A television viewer can control lighting, and room temperature, and arm/disarm sensors in the home such as door sensors, motion detectors, cameras, etc, as well as access camera images. Events from such sensors can be monitored or viewed on the television set when they are triggered. For example, when triggered, an icon representing the sensor can be shown on the television screen, or in case of a camera, an image or video can be shown that cause the triggered event.

24 Claims, 7 Drawing Sheets

(51) Int. Cl.
*H04N 5/445* (2011.01)
*H04N 21/41* (2011.01)
*H04L 12/28* (2006.01)
*H04N 21/4223* (2011.01)
*H04N 21/436* (2011.01)
H04N 21/222 (2011.01)
H04N 21/81 (2011.01)
G08B 13/196 (2006.01)
G08B 25/00 (2006.01)

(56) References Cited

U.S. PATENT DOCUMENTS

| | | | |
|---|---|---|---|
| 2004/0181811 A1 | 9/2004 | Rakib et al. | |
| 2005/0114900 A1* | 5/2005 | Ladd | H04L 12/2805 |
| | | | 725/100 |
| 2006/0271695 A1* | 11/2006 | Lavian | G06F 21/552 |
| | | | 709/229 |
| 2008/0129821 A1* | 6/2008 | Howarter | G08B 13/196 |
| | | | 348/143 |
| 2009/0288125 A1* | 11/2009 | Morioka | H04N 7/1675 |
| | | | 725/110 |

* cited by examiner

SYSTEM AND METHOD FOR HOME SECURITY MONITORING USING A TELEVISION SET-TOP BOX

CROSS REFERENCE TO RELATED APPLICATIONS

This application is a continuation of U.S. patent application Ser. No. 13/357,760 filed Jan. 25, 2012 entitled SYSTEM AND METHOD FOR HOME SECURITY MONITORING USING A TELEVISION SET-TOP BOX.

BACKGROUND

The present disclosure relates to home security monitoring and automation systems.

Conventional home security systems typically include a set of sensors that are monitored and/or controlled by a central panel that is usually mounted in the home. Various sensors can be installed at windows, doors, and other locations to detect intrusion. Trained technicians typically install such home security systems. In addition to the central panel being connected to installed sensors, the central panel is in turn in communication with a centralized monitoring center—which is remote to the home. Such a communication link is typically established over a telephone line. The centralized monitoring center and associated security service can then monitor a given house for a variety of events, such as window glass being broken, a door sensor being tripped, motion detection in a particular area, etc. Such centralized monitoring centers essentially monitor for home intrusions and other disturbances or anomalies. If intrusion is detected, then the monitoring system can sound an audible alarm and/or activate a silent alarm and/or contact law enforcement or other security services.

Advances in monitoring devices include sensors that are low-power wireless devices that can function for a couple of years on a single battery. Such devices can make installation easier, and improve flexibility of the security system. In addition to becoming wireless, sensors have expanded in scope and type of events that can be monitored. In addition to window and door sensors, other sensors can include thermometers, smoke alarms, lighting controllers, appliance controllers, motion detectors, video cameras, water sensors to detect if a sump pump fails or if flooding occurs in a laundry area, etc. A portable central home panel can then gather information from the wireless sensors. This central panel can then in turn communicate with a central monitoring station via a web portal. In addition to the central panel, home owners can connect to the home security system using a personal computer or smart phone.

SUMMARY

Despite advances in home security systems, such as wireless sensing devices, if a home owner does not constantly look at the home monitoring panel, then the home owner does not know what is happening in and around the home. Conventional monitoring systems are essentially isolated to the monitoring devices themselves and the central control panel. Thus, such security features lack integration with other home devices such as the television. What is absent from home security systems is the ability to monitor security status from conventional televisions, such as televisions connected to a set-top box for receiving televised content.

Techniques disclosed herein enable automated home security monitoring via a television connected to a set-top box, such as a cable set-top box. Such techniques provide an intuitive, seamless, and non-intrusive method of integrating the television with a home security system. With such techniques, a television viewer can use the television to control, interact, and automatically receive information about home security events in real-time. For example, a television viewer can control lighting, room temperature, and arm/disarm sensors in the home such as door sensors, motion detectors, cameras, etc, and access camera images. Events from such sensors can be monitored or viewed on the television set when they are triggered. For example, when triggered, an icon representing the sensor can be shown on the television screen, or in case of a camera, an image or video can be shown that caused the triggered event. A viewer can then ignore the event or select the event to get more information. Thus, while a user passively watches television, information about the user's home can be shown in real-time as home security events occur.

Techniques disclosed herein include systems and methods for monitoring a home security detection system using a television set-top box. The system can include a client running on a television set-top box communicating with a proxy server in the television network (such as a cable television network). The proxy server translates between a home security system (and accompanying remote servers) and the set-top box.

One embodiment includes a set-top box security manager application that executes a home security monitoring process or system. The security manager receives configuration input at a television set-top box via a television interface of a television connected to the television set-top box. For example, a user enters input via a television remote control. The configuration input affects configuration settings of a home security detection system, such as by modifying or otherwise setting parameters. The television set-top box receives a television signal from an external source, such as from a television broadcast facility. The television set-top box converts the television signal into television content delivered to the television. The security manager transmits the configuration settings of the home security detection system from the television set-top box to a proxy server. This proxy server is in communication with the home security detection system. The home security detection system can include multiple wireless or wired sensor devices installed in a corresponding home. The security manager receives, at the television set-top box, home security information corresponding to home security events detected by one or more of the wireless sensor devices installed in the corresponding home. The security manager can then deliver the home security information from the television set-top box to the television such that the television displays the home security information on the connected television.

Another embodiment includes a proxy server security manager application that executes a home security monitoring process or system. The security manager receives, at a proxy server, configuration settings of a home security detection system. The configuration settings are received from a television set-top box, such as after user input. The television set-top box receives television signals from an external source separate from the proxy server. The television set-top box converts the television signals into television content delivered to a television. The proxy server establishes communications with the home security detection system. The security manager receives, at the proxy server, home security events detected by the home security detection system. The home security detection system includes multiple wireless sensor devices installed in a corresponding home. The security manager identifies reportable home security events by comparing the home security events received at the proxy server with the configuration settings received from the television set-top box. The security manager formats reportable home security events as home security information according to a protocol of the television set-top box. The security manager transmits the home security information to the television set-top box such that the television displays the home security information.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving configuration input at a television set-top box via a television interface of a television connected to the television set-top box, the configuration input affecting configuration settings of a home security detection system, the television set-top box receiving a television signal from an external source, the television set-top box converting the television signal into television content delivered to the television; transmitting the configuration settings of the home security detection system from the television set-top box to a proxy server in communication with the home security detection system, the home security detection system including multiple wireless sensor devices installed in a corresponding home; receiving, at the television set-top box, home security information corresponding to home security events detected by one or more of the wireless sensor devices installed in the corresponding home; and delivering the home security information from the television set-top box to the television such that the television displays the home security information. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Time Warner Cable, New York City, N.Y.

As discussed above, techniques herein are well suited for use in software applications supporting home security monitoring and detection. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

U.S. patent application Ser. No. 13/357,760 filed Jan. 25, 2012 entitled SYSTEM AND METHOD FOR HOME SECURITY MONITORING USING A TELEVISION SET-TOP BOX is hereby incorporated herein by reference in its entirety.

Techniques disclosed herein enable automated home security monitoring via a television connected to a set-top box, such as a cable set-top box. Such techniques provide an intuitive, seamless, and non-intrusive method of integrating the television with a home security system. With such techniques, a television viewer can use the television to control, interact, and automatically receive information about home security events in real-time. For example, a television viewer can control lighting, and room temperature, and arm/disarm sensors in the home such as door sensors, motion detectors, cameras, etc, and access camera images. Events from such sensors can be monitored or viewed on the television set when they are triggered. For example, when triggered, an icon representing the sensor can be shown on the television screen, or in case of a camera, an image or video can be shown that cause the triggered event. A viewer can then ignore the event or select the event to get more information. Thus, while a user passively watches television, information about the user's home can be shown in real-time as home security events occur.

The system allows controlling and monitoring a home security system via a conventional television set, such as through a cable television service set top box that uses hybrid fiber coax as a delivery mechanism. The security manager enables using television broadcast infrastructures, such as OpenCable Application Platform (OCAP) and Enhanced TV Binary Interchange Format (EBIF) infrastructures, to allow users to monitor and control their home security system while watching television.

Figure 1:
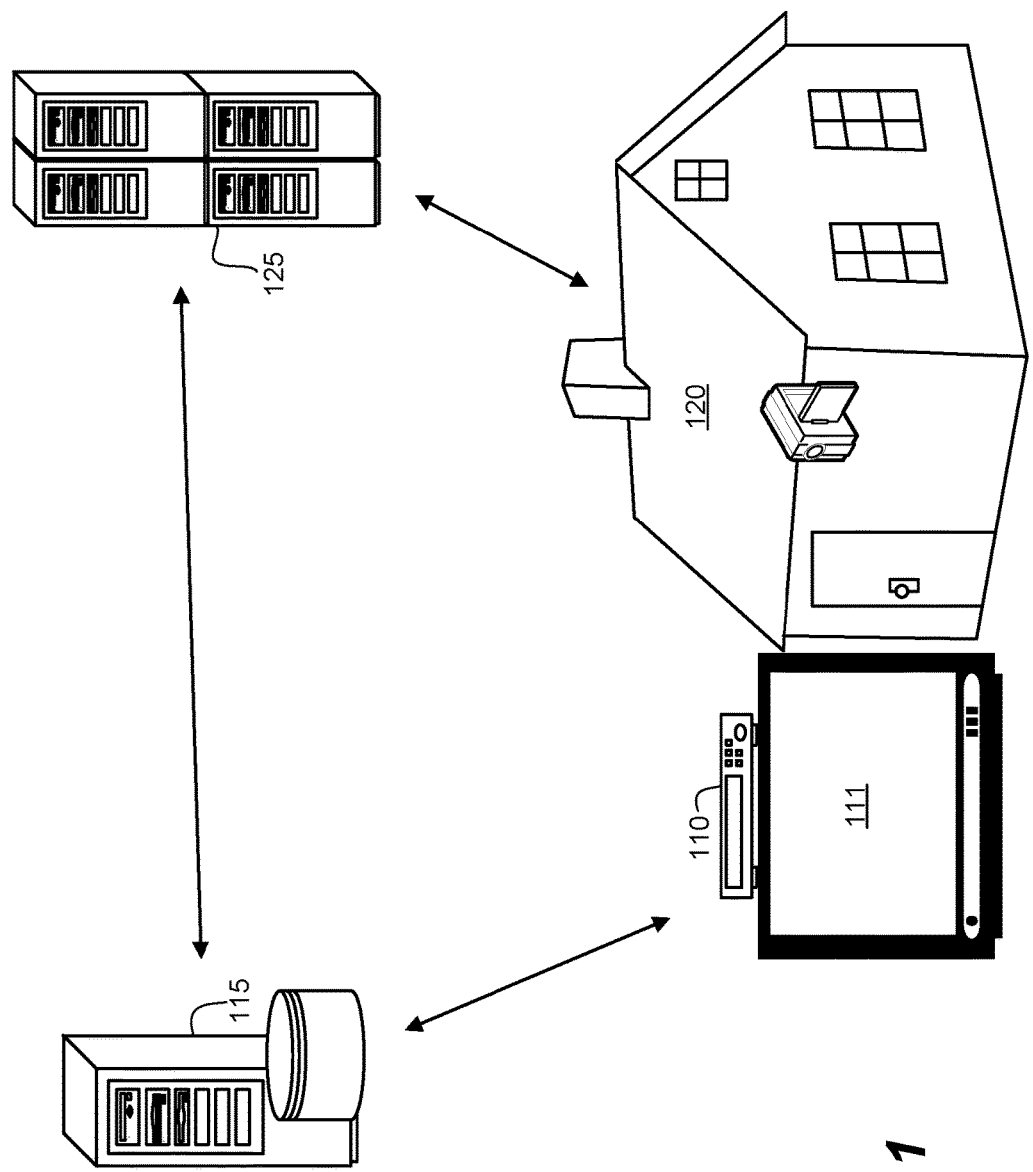
FIG. 1 is a block diagram of a system for home security monitoring using a television set-top box according to embodiments herein.

FIG. 1 illustrates an example environment for such security monitoring. This includes a television set-top box 110 connected to a television 111. Set-top box 110 is connected to a proxy server 115 over a communication network such as using a hybrid fiber coaxial connection. Home security system 120 includes a collection of sensors, detectors, actuators, cameras, and other monitoring devices in communication with a security panel located in the home. Home security system 120 is in communication with a home security server 125 over a communication network such as the Internet. Proxy server 115 can also communicate with home security server 125 via an Internet connection.

A set-top box security manager provides a technique for the panel at the home to signal to the set-top box that events have occurred (such as motion being detected or a door being left open). The system provides a process by which signals from the set-top box are communicated to the control panel (flat panel or touch panel) for controlling, sensors, cameras, light actuators, thermometers, thermostats, and so forth. There are various events that can be detected and controlled by the system.

The set-top box security manager can use a new protocol from the set-top box to the proxy server to control the different devices and monitor the different devices installed in a corresponding home. The proxy server is a server that sits between the set-top box and the home security server. The proxy server can function as the intelligence that connects the set-top box to the home security system for controlling devices, sensors, actuators, and cameras in the home. Typical security systems have only one control panel. With techniques herein, any television with a set-top box can control the security features. Some embodiments can include using a two-way communication mechanism of encoded messages between the set-top box and the proxy server using a cable modem termination system (CMTS) via a cable headend (not shown). The proxy server and the home security server can use IP-based messaging between each other. The home panel and home security server can also use IP-based messaging between each other.

In one example process, upon starting the set-top box the set-top box downloads a stack from the proxy server and/or additional television servers. A corresponding billing system identifies whether a particular user subscribes to a home security package. If there exists a subscription to the home security service, then part of the stack that is downloaded includes information to execute the home security monitoring system. Knowing about the existence of various sensors is handled by the proxy server, which can identify sensors, controllers, and what is controllable. New sensors can be added dynamically. Sensors would typically be physically installed by trained technicians.

Part of logging in to the system can include retrieving a status of all sensors. The system is configured such that the set-top box does not need to constantly pull for separate information, which helps with payload issues. Instead, the set-top box can be configured to pull at once or at predetermined intervals. The proxy server collects all of the monitoring information, collapses it down to a size that is small enough that the set-top box can handle, and then sends that collapsed and/or filtered information to the set-top box. Note that conventional television set-top boxes typically do not have the processing power of a personal computer. Moreover, the set-top boxes are relatively busy processing and rendering television signals and on-demand content. There are certain types of security information that the set-top box does not need to receive. This information will be detailed below. It is often the case that a majority of consumers prefer to have less data than more data relative to displayed security information. For example, most consumers would not be interested in knowning device ID numbers and time zone stamps of events, while such consumers would want to know if a system was armed or not.

Much of the security monitoring, such as event detection and looping, is executed at the proxy server. If the proxy server discovers that an event is happening, then the proxy server sends a signal down to the set-top box to display that event. Otherwise, the set-top box does not receive status updates. The proxy server connects with the home security server at intervals, such as long poll intervals. If no event has occurred within a given period (such as 30 or 60 seconds), then the system reconnects as a mechanism to remove unneeded port connections. After the system initializes and collects a full list of sensors, the proxy server enters an event loop. If there is an event that is triggered during that interval, then that event is processed at the proxy server. If no event occurs before the timeout, then the proxy server disconnects, and then reconnects immediately. So there is no loss in perceived connection.

A given user may not want to be alerted to all home security events that occur in the home. For example, during viewing of a televised sporting event, a viewer may not want to be interrupted unless there is activity at an exterior door to the home, or if an exterior door has been open for more than 30 seconds or some other predetermined amount of time. Other events such as windows or interior doors being opened could be filtered and not sent to the set-top box. Such filtering can be based on home security zones, types of sensors, types of events, or any other criteria.

For example, a given set-top box may be configured to alert only when motion is detected at a front door, and to display an image of activity at the front door. For example, a pizza delivery person approaches a front door, a motion detector installed near the front door detects the motion and then a corresponding network camera takes still or moving images. An alert can then be displayed on a television with the option to view an image. A user selecting the alert can then see a picture of a person at the front door or video of the person at the front door. Delivering video can include some translation or transcoding to transmit images via quadrature amplitude modulation (QAM) over a cable television connection. In response to further requests about a particular event, a camera can be contacted directly by the proxy server, and then communicate directly to the proxy server to feed additional video and/or images. This can involve authentication prior to bypassing the home security server.

The following description will now provide even more details about the various embodiments.

Communication between the set-top box and the proxy server can be based on certificates or other secure authentication process. Likewise, the proxy server and home security server can use HTTPS or other secure protocol. The proxy server can use a mobile portal interface to communicate with the home security server. Part of the mobile portal protocol can be to maintain a secure connection, once established, between the client (the proxy server) and the home security server, so that updates of sensor (door, smoke detectors, etc.), and control (arm, disarm, etc.) status changes can be sent in real-time. With some set-top boxes, however, there are guidelines. For example, OCAP applications cannot maintain a connection forever to the proxy server waiting for an event to occur. Instead, when the proxy server receives an event from the home security server, the proxy server will relay the event to the set-top box using an OCAP trigger mechanism.

Camera and sensor lists can be limited. The proxy servers can send a list of door sensors and camera lists to the set-top box security manager in the set-top box when the application successfully logs into the system using a login protocol flow. Any sensor, actuator, or camera can be supported in the protocol.

The proxy server can access a camera via the portal. The proxy server can access video and images such as accessing JPEG pictures. Pictures and video can be delivered via the proxy server, or directly to the set-top box using a bridging mechanism. Such bridging may involve transcoding a given video format.

The proxy server can use a database to associate a set-top box MAC address to a home security account. The database can contain a set of preferences for each user/set-top box to set which device/sensor event change will cause a trigger to be sent by the proxy server to the set-top box. Not all sensors and device state changes need to interrupt television viewing. A user can set preferences to indicate any events that should interrupt television viewing. The system can also integrate a provisioning system and update preferences or rules accordingly.

Figure 2:
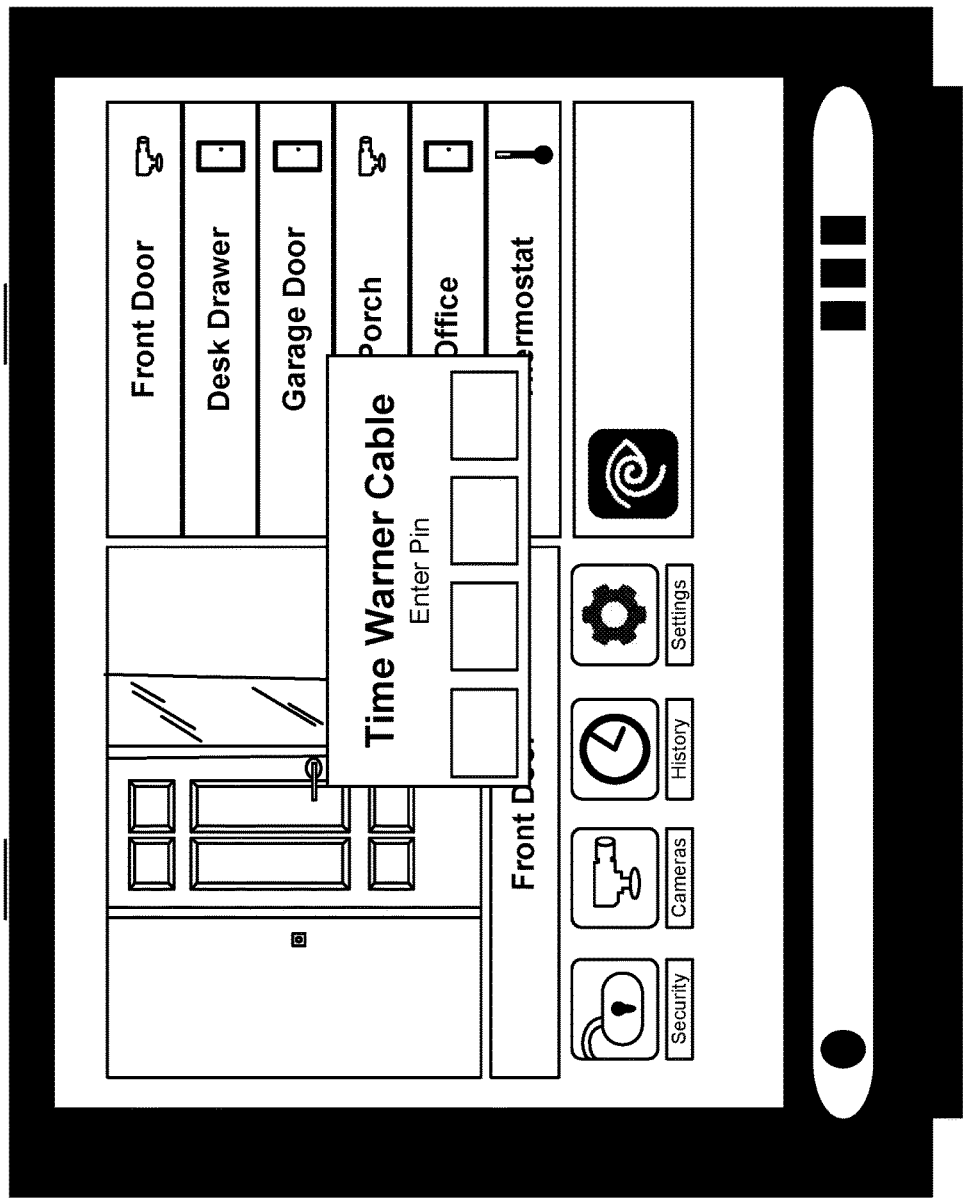
FIG. 2 is an example illustration of a dashboard screen for controlling a home security system monitoring system using a television interface according to embodiments herein.

The set-top box can control/provide various features such as a television user interface, system login, current sensor status, camera snapshots and motion detection, event history, real-time events, arm/disarm smart home security, and preference settings. The set-top box can essentially provide an interface to a home security detection system such as would be displayed at a home panel. FIG. 2 shows an example interface to the home security system from a television connected to the set-top box.

An initial step of the set-top box security manager can be to retrieve the set-top box MAC address and query the proxy server if the subscriber is subscribing to the service. If the subscriber set-top box MAC address is not found in the database or there is no corresponding user account, then the set-top box security manager can provide an interface to subscribe to such a service. If the MAC address is found in the database (the subscriber is subscribing to the security service), then the proxy server will attempt to retrieve and validate the session ID and associated event. Part of initial validation can require using a PIN. In other embodiments, read-only access to the home security system can be provided without requiring a PIN. Once a subscriber has successfully logged in using the set-top box security manager, the security manager can retrieve the current sensor, camera lists and their statuses.

The proxy server can collect various data from the home security server. Account data can include cellular wireless data, account number, arming status, system protocol version, connection type (broadband), type of armed setting, premise ID, time zone of where the control panel is installed, and MAC address. Of these, the proxy server can filter most data and send to the set-top box, for example, an ARM status and ARM setting.

Some home security monitoring systems can be organized into zones. Zones can be defined by physical location or type of sensor, etc. Zone information delivered to the proxy server can include zone type, trouble type, radio frequency of the sensor, whether the zone is bypassed during arming, sensor temperature, zone order number in the home control panel, sensor signal strength, zone ID, zone label, sensor type, sensor serial numbers, zone number, etc. Most of this information can be selectively filtered or modified so that a given set-top box may receive only information identified as desirable at the television, such as zone type, a translated time stamp, temperature, bypass status, sensor type and sensor status.

Likewise, with a camera list, camera order and labels can be delivered, while the proxy server filters out camera model number, camera manufacturer, etc. Camera data, as well as other sensor data, can be delivered using JSON objects.

The set-top box can provide a display dashboard for a user to begin controlling the home security system. An example dashboard is shown in FIG. 2. Such a dashboard can first require a PIN for use, and then provide icons for selection to access security features, cameras, history, settings, and so forth. The dashboard screen can show a few key or commonly accessed sensors as shown in FIG. 2.

The set-top box security manager can request camera snap shots. The proxy server can transcoded an image format and/or reduce file size to be more easily rendered using the set-top box. Motion sensors can be coupled with any of the cameras or zones. Accordingly, motion detectors can be set so that corresponding cameras take a snap shot or video to transmit to the set-top box. This motion can be any motion or limited to a particular viewing area such as a doorknob. In response to a motion event, an alert or image can be automatically displayed on the television, either as a full screen interruption or as a partial screen pop-up, selectable alert or image.

The set-top box security manager can provide event history, accessible via the dashboard or other interface. Events can be accessible by type, zone, time, etc. Various events can be displayed such as if a particular door/window is opened, closed, open for more than a threshold amount of time, etc. Other events can include arming and delay exit events.

Whenever there is an arming or delay exit event that is detected by a door or other sensor, a message is relayed to the home security server such as with a JSON array object.

Whenever there is an arming/disarming event the proxy server is signaled, which can then signal the set-top box to display a pop-up alert or to display a status change if already on a security display screen. Likewise, whenever a user arms or disarms the home security system via the set-top box, a signal is transmitted to the proxy server, which instructs the home security server, which can then signal the home control panel to change arm status.

Figure 7:
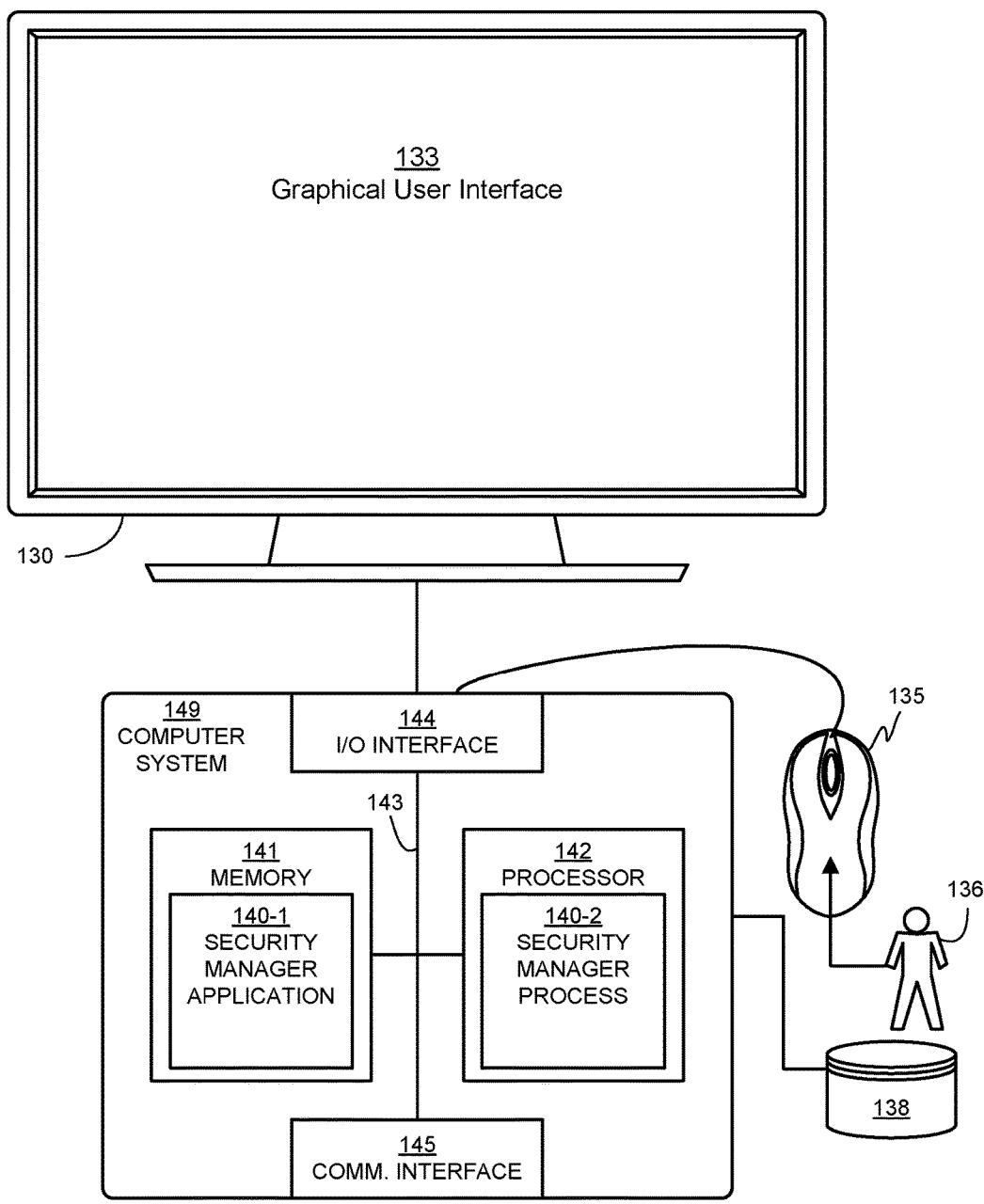
FIG. 7 is an example block diagram of a home security monitoring system operating in a computer/network environment according to embodiments herein.

FIG. 7 illustrates an example block diagram of a security manager 140 operating in a computer/network environment according to embodiments herein. In summary, FIG. 7 shows computer system 149 displaying a graphical user interface 133 that provides a home security monitoring and control interface. Computer system 149 can connect to a remote server for processing assistance. Computer system hardware aspects of FIG. 7 will be described in more detail following a description of the flow charts.

Functionality associated with security manager 140 will now be discussed via flowcharts and diagrams in FIG. 3 through FIG. 6. For purposes of the following discussion, the security manager 140 or other appropriate entity performs steps in the flowcharts.

Figure 3:
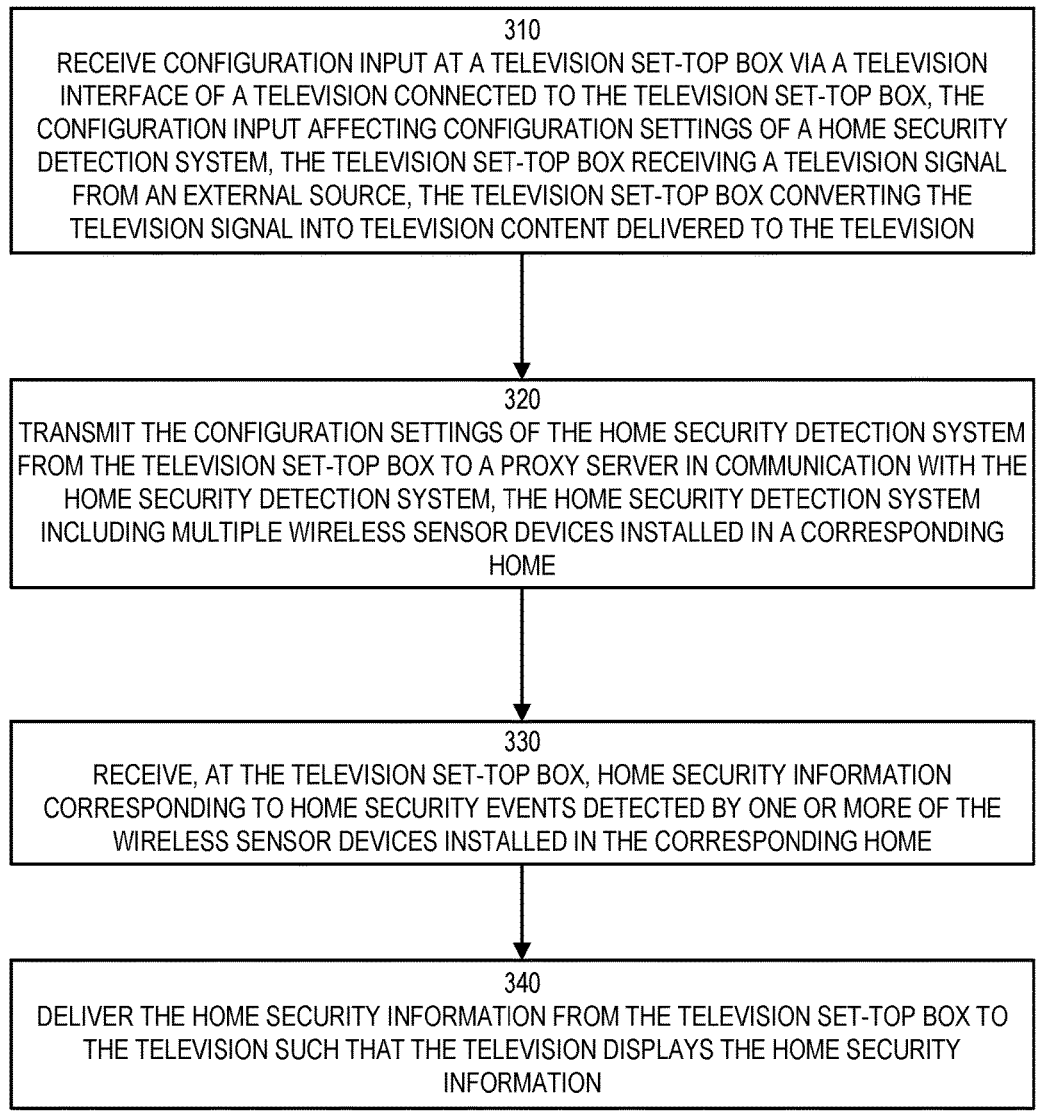
FIG. 3 is a flowchart illustrating an example of a process supporting home security system monitoring according to embodiments herein.

Now describing embodiments more specifically, FIG. 3 is a flow chart illustrating embodiments disclosed herein. In step 310, security manager 140 receives configuration input at a television set-top box via a television interface of a television connected to the television set-top box. For example, a user can use a remote control that signals the set-top box while the set-top box generates a selection display on a connected television. The configuration input affects configuration settings of a home security detection system. In other words, the configuration input can either change, modify or establish configuration settings of the security system. The television set-top box receives a television signal from an external source, and the television set-top box converting the television signal into television content delivered to the television. In other words, the television set-top box contains circuitry to display/render television signals transmitted via a television connection.

In step 320, the security manager 140 transmits the configuration settings of the home security detection system from the television set-top box to a proxy server in communication with the home security detection system. The proxy server can be located at a remote location and serve multiple subscribers. The home security detection system can include multiple wireless sensor devices installed in a corresponding home. Such sensor devices can detect door and window positions, detect motion, detect temperature, capture video, etc.

In step 330, the security manager 140 receives, at the television set-top box, home security information corresponding to home security events detected by one or more of the wireless sensor devices installed in the corresponding home. For example, an indication that motion has been detected in a particular zone, or a particular door is in an open position.

In step 340, the security manager 140 delivers the home security information from the television set-top box to the television such that the television displays the home security information. In other words, the set-top box sends video data to the television that the television can display.

Figure 4:
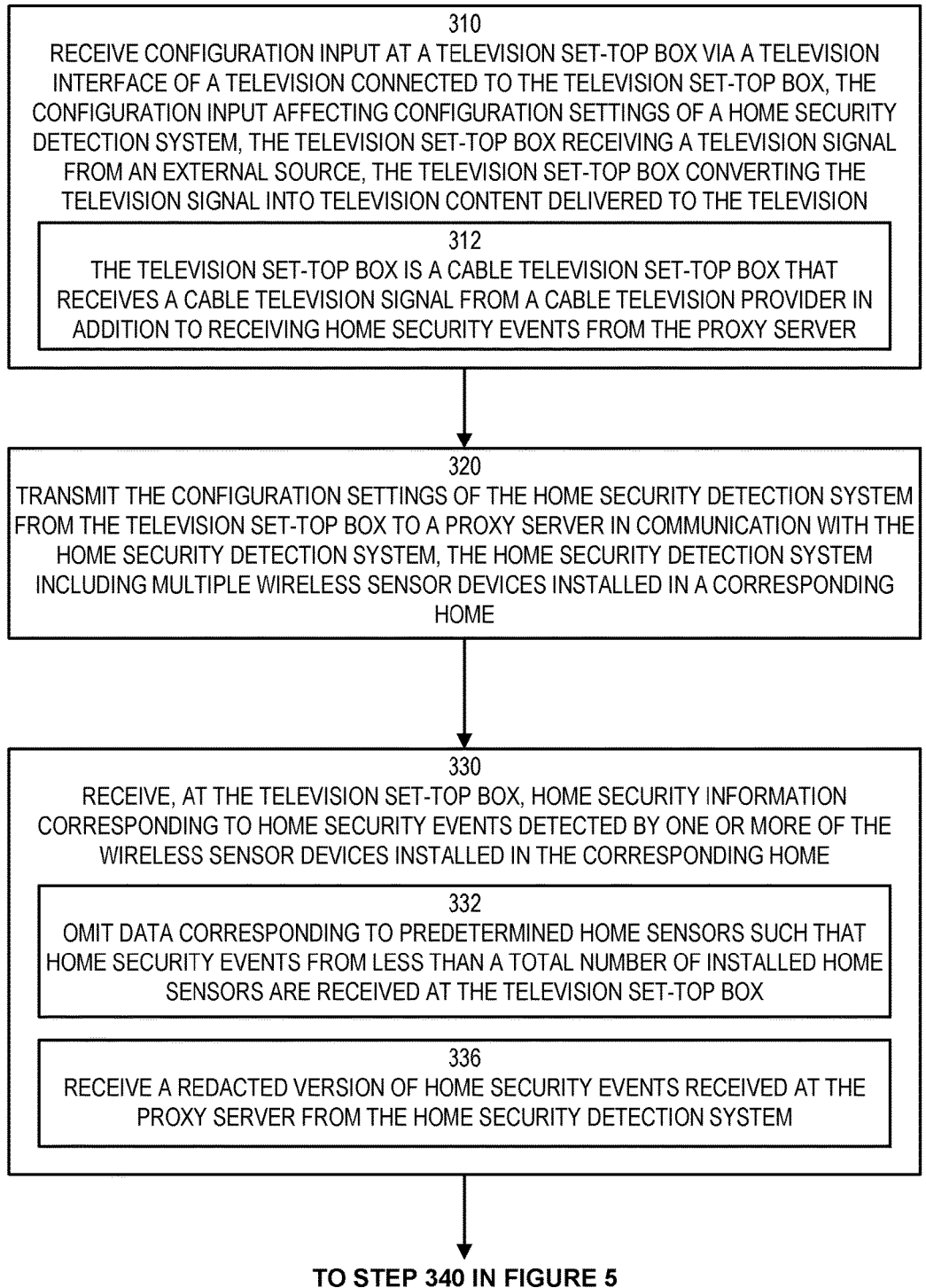
FIGS. 4-5 are a flowchart illustrating an example of a process supporting home security system monitoring according to embodiments herein.
Figure 5:
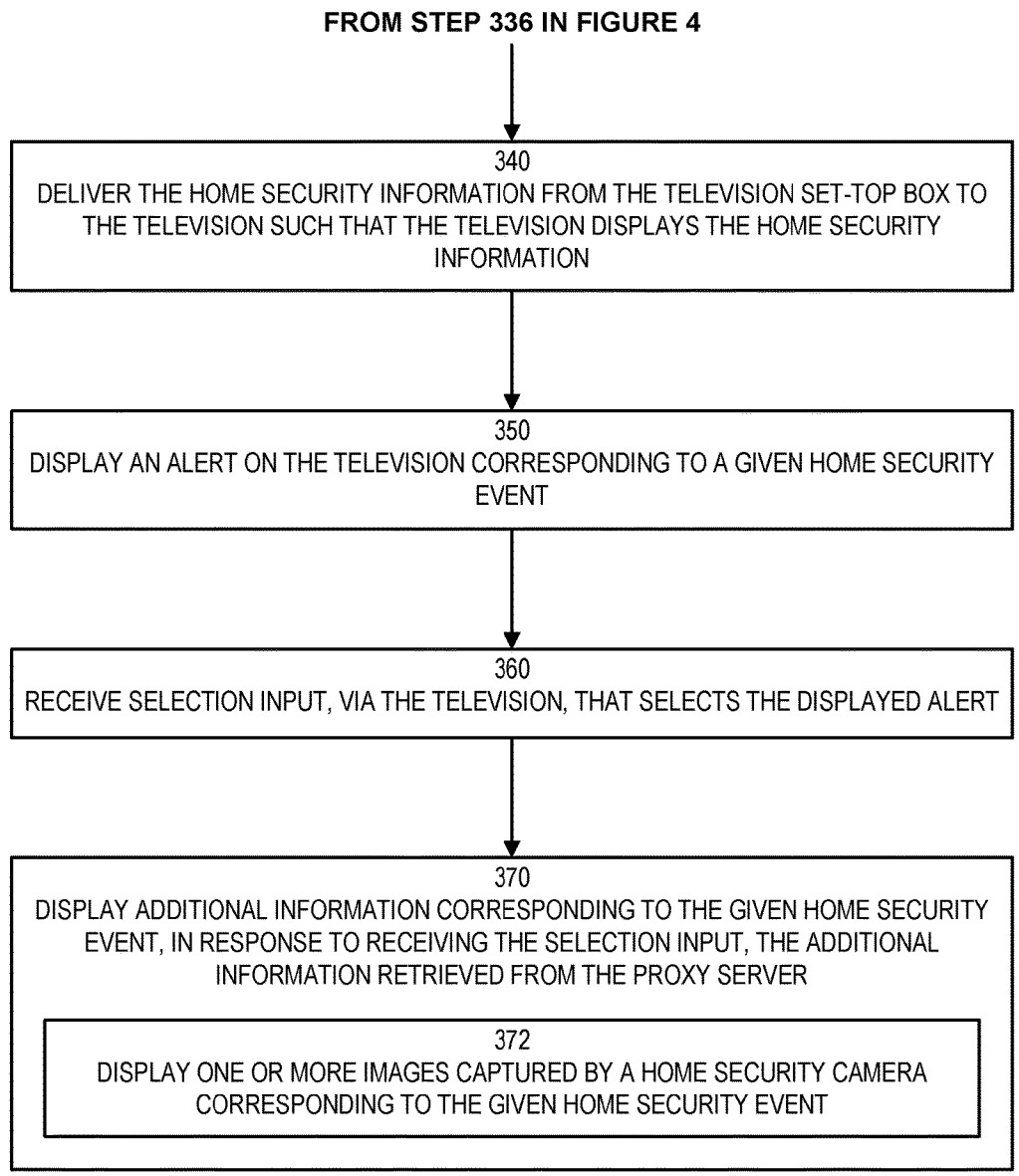

FIGS. 4-5 include a flow chart illustrating additional and/or alternative embodiments and optional functionality of the security manager 140 as disclosed herein.

In step 310, security manager 140 receives configuration input at a television set-top box via a television interface of a television connected to the television set-top box. The configuration input affects configuration settings of a home security detection system. The television set-top box receives a television signal from an external source, and the television set-top box converts the television signal into television content delivered to the television.

In step 312, the television set-top box is a cable television set-top box that receives a cable television signal from a cable television provider in addition to receiving home security events from the proxy server. The cable television signal can be received at the television set-top box via a hybrid fiber-coaxial (HFC) network, with the television set-top box executing OpenCable Application Platform (OCAP).

In step 320, the security manager 140 transmits the configuration settings of the home security detection system from the television set-top box to a proxy server in communication with the home security detection system. The home security detection system can include multiple wireless sensor devices installed in a corresponding home.

In step 330, the security manager 140 receives, at the television set-top box, home security information corresponding to home security events detected by one or more of the wireless sensor devices installed in the corresponding home. Receiving home security information corresponding to home security events can include at least one home security event triggered by a motion detection sensor.

In step 332, the security manager 140 omits data corresponding to predetermined home sensors such that home security events from less than a total number of installed home sensors are received at the television set-top box. In other words, the home security system and proxy server can be configured so that only particular home security events are reported or delivered to the set-top box.

In step 336, the security manager 140 receives a redacted version of home security events received at the proxy server from the home security detection system. For example, the set-top box can receive home security information after the proxy server filters a portion of the data.

In step 340, the security manager 140 delivers the home security information from the television set-top box to the television such that the television displays the home security information.

In step 350, the security manager 140 displays an alert on the television corresponding to a given home security event. For example a pop-up, scrolling alert, or other interruption can be used to display this.

In step 360, the security manager 140 receives selection input, via the television, that selects the displayed alert. For example a user with a remote control navigates to the alert and selects the alert via the remote control.

In step 370, the security manager 140 displays additional information corresponding to the given home security event in response to receiving the selection input, the additional information is retrieved from the proxy server. For example, an initial alert may display text only, or a snap shot taken from a camera. A user can then request additional images and/or video that can then be retrieved from the proxy server.

In step 372, the security manager 140 displays one or more images captured by a home security camera corresponding to the given home security event. The one or more images have been transcoded at the proxy server prior to being transmitted to the television set-top box.

Figure 6:
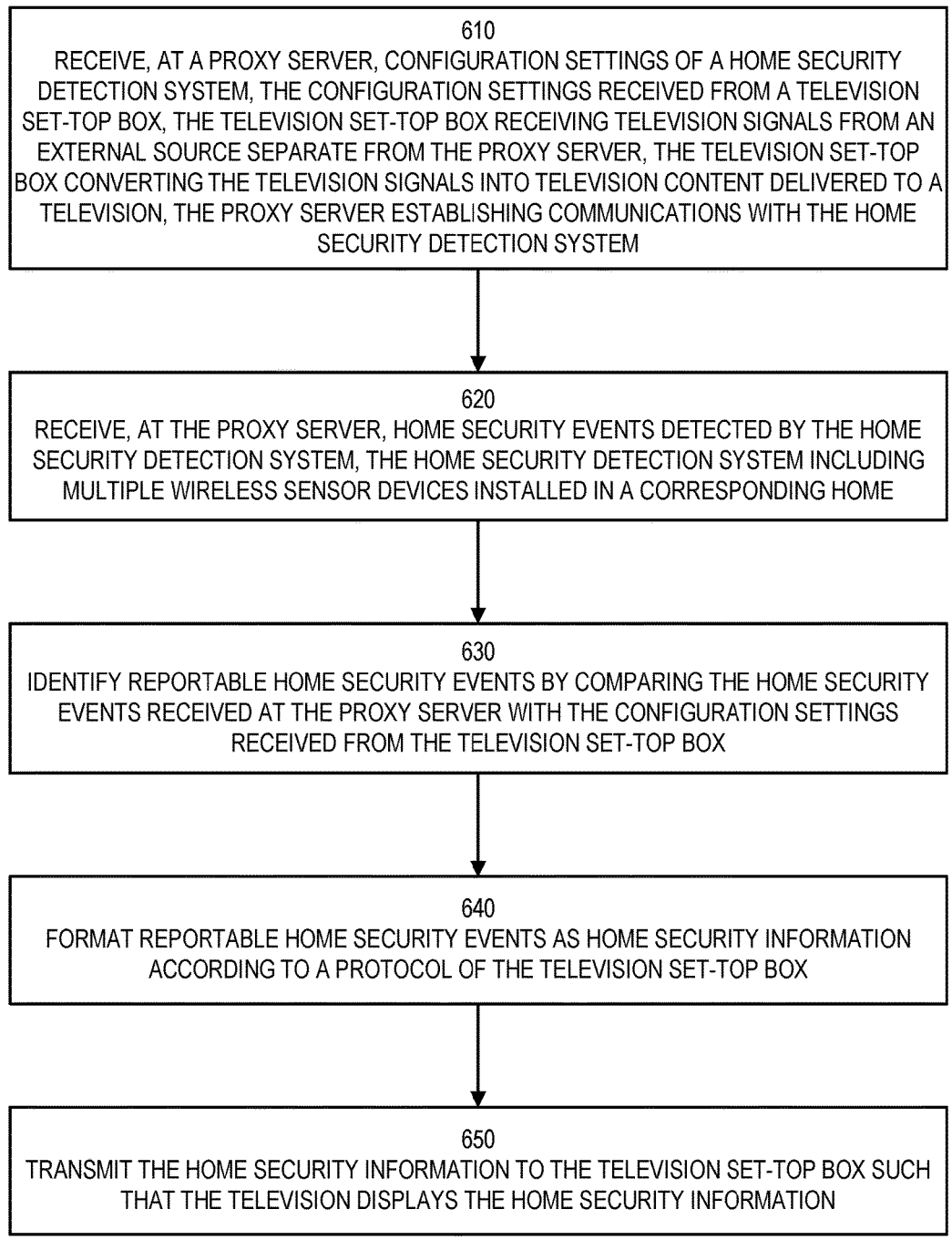
FIG. 6 is a flowchart illustrating an example of a process supporting home security system monitoring according to embodiments herein.

FIG. 6 describes additional embodiments, such as process steps executed at a server device. In step 610, a proxy server receives configuration settings of a home security detection system. The proxy server receives the configuration settings from a television set-top box. The television set-top box being configured such that it receives television signals from an external source separate from the proxy server. The television set-top box converts the television signals into television content delivered to a television. The proxy server also establishes communications with the home security detection system.

The television set-top box can be a cable television set-top box receiving a cable television signal from a cable television provider in addition to receiving home security events from the proxy server. The cable television signal can be received at the television set-top box via a hybrid fiber-coaxial (HFC) network such that the television set-top box executes OpenCable Application Platform (OCAP).

In step 620, the proxy server receives home security events detected by the home security detection system. The home security detection system includes multiple wireless sensor devices installed in a corresponding home. The proxy server can receive the home security events from a home security server in communication with a control panel located in a corresponding home. The home security server can be in a remote location relative to the control panel located in the corresponding home. At least one home security event can be triggered by a motion detection sensor.

In step 630, the proxy server identifies reportable home security events by comparing the home security events received at the proxy server with the configuration settings received from the television set-top box. In other words, the proxy server can filter home security events to report only a portion of those events to the set-top box. The proxy server can omit data corresponding to predetermined home sensors such that the home security information transmitted to the television set-top box corresponds to home security events associated with a portion of installed home sensors that is less than a total number of installed home sensors.

In step 640, the proxy server formats reportable home security events as home security information according to a protocol of the television set-top box. Note that while the proxy server can receive home security events over an IP network, the proxy server may transmit those events to the set-top box via a CMTS system or other mechanism distinct from IP transmission.

In step 650, the proxy server transmits the home security information to the television set-top box such that the television displays the home security information.

In other embodiments, the proxy server can establish a connection to the home security server, release the connection to the home security server prior to a connection timeout, and then reestablishing the connection (a new connection) with the home security server. The proxy server can receive a request for one or more images captured by a home security camera corresponding to the at least one home security event, transcode the one or more images to a format readable by the television set-top box, reduce a file size of the one or more images, and transmit the one or more images to the television set-top box. The proxy server can receive a request from the television set-top box to view status of at least one door or window sensor, retrieve status of the at least one door or window sensor, and transmit status of the at least one door or window sensor to the television set-top box.

Continuing with FIG. 6, the following discussion provides a basic embodiment indicating how to carry out functionality associated with the security manager 140 as discussed above. It should be noted, however, that the actual configuration for carrying out the security manager 140 can vary depending on a respective application. For example, computer system 149 can include one or multiple computers that carry out the processing as described herein.

In different embodiments, computer system 149 may be any of various types of devices, including, but not limited to, a television set-top box, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the security manager 140 of computer system 149 to communicate over a network and, if necessary, retrieve any data required to create views, process content, communicate with a user, etc. according to embodiments herein.

As shown, memory system 141 is encoded with security manager 140-1 that supports functionality as discussed above and as discussed further below. Security manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the security manager 140-1. Execution of the security manager 140-1 produces processing functionality in security manager process 140-2. In other words, the security manager process 140-2 represents one or more portions of the security manager 140 performing within or upon the processor 142 in the computer system 149.

It should be noted that, in addition to the security manager process 140-2 that carries out method operations as discussed herein, other embodiments herein include the security manager 140-1 itself (i.e., the un-executed or non-performing logic instructions and/or data). The security manager 140-1 may be stored on a non-transitory, tangible computer-readable storage medium including computer readable storage media such as floppy disk, hard disk, optical medium, etc. According to other embodiments, the security manager 140-1 can also be stored in a memory type system such as in firmware, read only memory (ROM), or, as in this example, as executable code within the memory system 141.

In addition to these embodiments, it should also be noted that other embodiments herein include the execution of the security manager 140-1 in processor 142 as the security manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method of home security monitoring, comprising:
   receiving configuration input, the configuration input affecting configuration settings of a home security detection system, the home security detection system including a control panel and at least one sensor device;
   transmitting the configuration settings of the home security detection system to a proxy server, the proxy server being in communication with a home security server, and the home security server being in communication with the control panel of the home security detection system;
   receiving, at a television set-top box from the proxy server, home security information corresponding to at least one home security event detected by the at least one sensor device, the home security information from the home security server being monitored by the proxy server for discovering the at least one home security event, the home security information being transmitted by the proxy server to the television set-top box upon the discovering, by the proxy server, of the at least one home security event; and
   delivering the home security information from the television set-top box to a television such that the television displays the home security information.

2. The computer-implemented method of claim 1, wherein data corresponding to predetermined home sensors are omitted, by the proxy server, from the home security information such that home security events from less than a total number of installed home sensors are received at the television set-top box.

3. The computer-implemented method of claim 1, wherein the receiving of the home security information corresponding to the at least one home security event includes receiving a redacted version of home security events received at the proxy server from the home security detection system.

4. The computer-implemented method of claim 1, wherein the at least one home security event discovered by the proxy server corresponds to a respective home security event triggered by a motion detection sensor.

5. The computer-implemented method of claim 1, wherein the delivering of the home security information from the television set-top box to the television such that the television displays the home security information includes displaying an alert on the television corresponding to a given home security event, and wherein the computer-implemented method further comprises:
   receiving a selection input, via the television, that selects the displayed alert; and
   in response to the receiving of the selection input, displaying additional information corresponding to the given home security event, the additional information being retrievable from the proxy server.

6. The computer-implemented method of claim 5, wherein the displaying of the additional information includes displaying one or more images captured by a home security camera corresponding to the given home security event.

7. The computer-implemented method of claim 6, wherein the one or more images have been transcoded at the proxy server prior to being transmitted to the television set-top box.

8. The computer-implemented method of claim 1, wherein the television set-top box is a cable television set-top box receiving a cable television signal from a cable television provider in addition to receiving home security events from the proxy server.

9. The computer-implemented method of claim 8, wherein the cable television signal is received at the television set-top box via a hybrid fiber-coaxial (HFC) network, and wherein the television set-top box is executing OpenCable Application Platform (OCAP).

10. A television set-top box, comprising:
   a processor; and
   a memory coupled to the processor, the memory storing instructions that, when executed by the processor, cause the television set-top box to:
      receive configuration input, the configuration input affecting configuration settings of a home security detection system, the home security detection system including a control panel and at least one sensor device;
      transmit the configuration settings of the home security detection system to a proxy server, the proxy server being in communication with a home security server, and the home security server being in communication with the control panel of the home security detection system;
      receive, from the proxy server, home security information corresponding to at least one home security event detected by the at least one sensor device, the home security information from the home security server being monitored by the proxy server for discovering the at least one home security event, the home security information being transmitted by the proxy server to the television set-top box upon the discovering, by the proxy server, of the at least one home security event; and
      deliver the home security information to a television such that the television displays the home security information.

11. A computer-implemented method of home security monitoring, comprising:
   receiving, at a proxy server, configuration settings of a home security detection system, the home security detection system including a control panel and at least one sensor device, the proxy server being in communication with a home security server, the home security server being in communication with the control panel of the home security detection system;
   monitoring, by the proxy server, home security information from the home security server for discovering an indication of at least one home security event detected by the at least one sensor device;
   upon the discovering, by the proxy server, of the indication of the at least one home security event, identifying, by the proxy server, reportable home security events by comparing the indication of the at least one home security event with the configuration settings;

formatting, by the proxy server, the reportable home security events as the home security information according to a protocol of a television set-top box; and transmitting, by the proxy server, the home security information to the television set-top box such that a television displays the home security information.

12. The computer-implemented method of claim 11, wherein the identifying of the reportable home security events includes omitting, by the proxy server, data corresponding to predetermined home sensors such that the home security information transmitted to the television set-top box corresponds to home security events associated with a portion of installed home sensors that is less than a total number of installed home sensors.

13. The computer-implemented method of claim 11, wherein the monitoring of the home security information from the home security server includes monitoring the home security information from the home security server in communication with the control panel of the home security detection system, the home security server being in a remote location relative to the control panel.

14. The computer-implemented method of claim 13, further comprising:
establishing a connection to the home security server;
releasing the connection to the home security server prior to a connection timeout; and
reestablishing the connection with the home security server.

15. The computer-implemented method of claim 11, wherein the monitoring of the home security information from the home security server includes monitoring, by the proxy server, the home security information for discovering a respective home security event triggered by a motion detection sensor.

16. The computer-implemented method of claim 15, further comprising:
receiving, at the proxy server, a request for one or more images captured by a home security camera corresponding to the at least one home security event;
bypassing, by the proxy server, the home security server for directly contacting the home security camera;
having directly contacted the home security camera, receiving, at the proxy server, the one or more images from the home security camera;
transcoding, by the proxy server, the one or more images to a format readable by the television set-top box;
reducing, by the proxy server, a file size of the one or more images; and
transmitting, by the proxy server, the one or more images to the television set-top box.

17. The computer-implemented method of claim 11, further comprising:
receiving, at the proxy server, a request from the television set-top box to view a status of at least one door or window sensor,
wherein the monitoring of the home security information includes monitoring, by the proxy server, the home security information from the home security server for discovering the status of the at least one door or window sensor, and wherein the transmitting of the home security information includes transmitting, by the proxy server, the home security information including the status of the at least one door or window sensor to the television set-top box.

18. The computer-implemented method of claim 11, wherein the television set-top box is a cable television set-top box receiving a cable television signal from a cable television provider in addition to receiving home security events from the proxy server.

19. The computer-implemented method of claim 18, wherein the cable television signal is received at the television set-top box via a hybrid fiber-coaxial (HFC) network, and wherein the television set-top box is executing OpenCable Application Platform (OCAP).

20. A proxy server, comprising:
a processor; and
memory coupled to the processor, the memory storing instructions that, when executed by the processor, cause the proxy server to:
receive configuration settings of a home security detection system, the home security detection system including a control panel and at least one sensor device, the proxy server being in communication with a home security server, the home security server being in communication with the control panel of the home security detection system;
monitor home security information from the home security server for discovering an indication of at least one home security event detected by the at least one sensor device;
upon the discovering of the indication of the at least one home security event, identify reportable home security events by comparing the indication of the at least one home security event with the configuration settings;
format the reportable home security events as the home security information according to a protocol of a television set-top box; and
transmit the home security information to the television set-top box such that a television displays the home security information.

21. The computer-implemented method of claim 1 wherein the receiving of the configuration input includes receiving the configuration input at the television set-top box via a television interface of the television connected to the television set-top box.

22. The television set-top box of claim 10 wherein the television set-top box is operable to receive the configuration input via a television interface of the television.

23. The computer-implemented method of claim 11 wherein the receiving of the configuration settings includes receiving the configuration settings at the proxy server from the television set-top box.

24. The proxy server of claim 20, wherein the proxy server is operable to receive the configuration settings from the television set-top box.

* * * * *